May 27, 1952 | E. B. BRADY | 2,598,343

PROGRAM AND COMMUNICATION SYSTEM FOR
DRIVE-IN THEATERS OR RESTAURANTS
Filed March 10, 1949

INVENTOR.
EDWARD B. BRADY
BY Hudson, Boughton,
Williams, David & Hoffmann.
ATTORNEYS Patented May 27, 1952

2,598,343

UNITED STATES PATENT OFFICE 2,598,343

PROGRAM AND COMMUNICATION SYSTEM FOR DRIVE-IN THEATERS OR RESTAURANTS

Edward B. Brady, Cleveland, Ohio

Application March 10, 1949, Serial No. 80,676

1 Claim. (Cl. 179—6.3)

The present invention relates to drive-in theatres, drive-in restaurants, and drive-in theatre-restaurants provided with in-car program reproduction units connected with a program source for furnishing entertainment to customers while seated in their cars.

The principal object of the invention is the provision of a sound reproduction and communication system for use in drive-in restaurants, and drive-in threatre-restaurants, which system comprises a plurality of in-car speaker units distributed throughout the parking area of the restaurant or theatre-restaurant and which speaker units can temporarily be placed inside the patrons' cars, the speaker units being adapted to be connected with a central source of sound programs and with a speaker-talk-back unit in the restaurant or concession stand, in combination with coin operated means at the speaker units for connecting the individual speaker units with the program source for predetermined periods, and manually operated means at the speaker units for connecting the individual speaker units with the speaker-talk-back unit independently of the coin operated control means.

Another object of the invention is the provision of a novel and improved, sound reproducing system for use in drive-in theatres, which system comprises a plurality of in-car speaker units distributed throughout the parking area of the theatre, which speaker units can temporarily be placed inside the cars of patrons of the theatre, in combination with individual coin operated or controlled means for each speaker unit forming a part of or located adjacent to the speaker units for connecting the individual speaker units with the program source, whereby the admission charge payable for attending the theatre may be collected without the necessity of attendants and after the cars are parked as distinguished from the present practice of having attendants collect the admission charge at the entrance gate.

Figure 1:
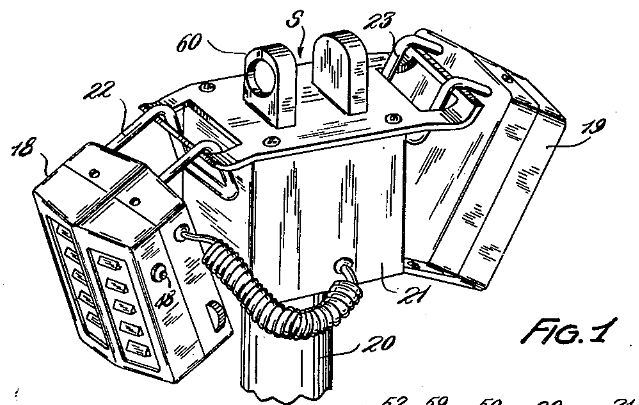
Figure 2:
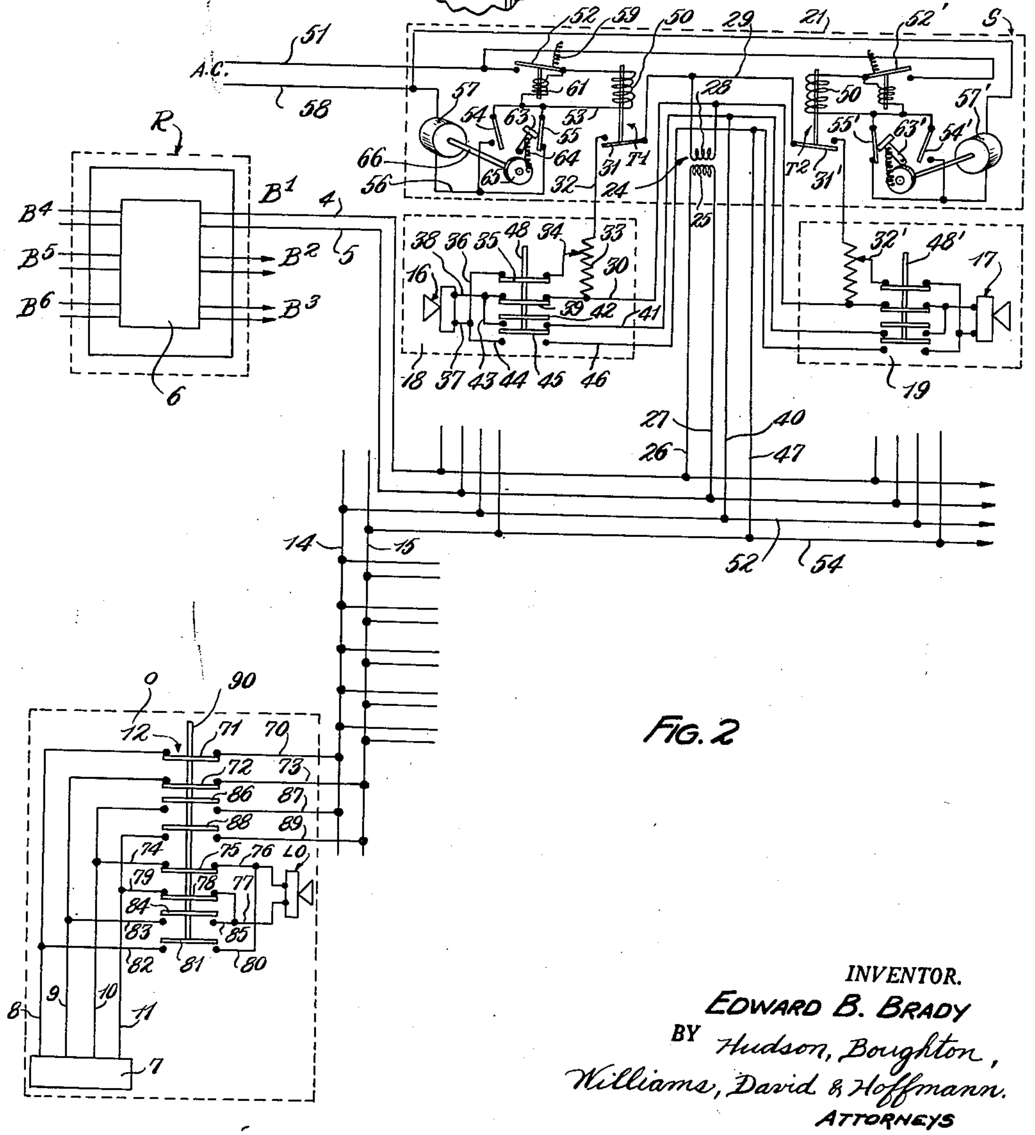

The invention resides in certain constructions and combinations and arrangement of parts and further objects and advantages will be apparent to those skilled in the art to which it relates from the following description of the preferred embodiment described with reference to the accompanying drawings forming a part of this specification in which Fig. 1 is a fragmentary, perspective view of a customer's in-car speaker station of a drive-in theatre-restaurant equipped with the present invention; and Fig. 2 is a fragmentary, schematic wiring diagram of a communication system for a drive-in theatre-restaurant embodying the present invention.

Although the present invention may be employed with various drive-in businesses or enterprises, it is particularly applicable to drive-in restaurants and drive-in theatre-restaurants and is herein shown and described as embodied in a drive-in restaurant or drive-in threatre-restaurant. The preferred embodiment of the invention contemplates a system comprising speaker stations distributed throughout a parking area, which stations each includes a stand having a pair of speaker units supported thereon, which units are connected to a central sound program source for reproduction of programs and to a speaker-talk-back unit in the restaurant whereby the speaker units may be used as a microphone and speaker for communicating with the restaurant operators. The individual speaker units may be detached from the stand and placed inside cars parked on either side of the stand for reproducing the sound programs inside the cars or, if desired, for communication with the restaurant operators for placing food orders or for other reasons. Coin controlled means is provided at each speaker unit whereby the sound programs are only available at the speakers for a predetermined period after a coin has been deposited in the control means. Also, control means is provided at the speaker units and at the speaker-talk-back unit in the restaurant whereby communications may be carried out through the individual speakers regardless of whether or not a coin has been deposited in the coin control means.

The sound program source may merely reproduce music and other audible entertainment, such as records, wired-in programs and radio or it may be desirable that the sound reproducing station be associated with a source of visual programs, such as a sound motion picture projector, or the sound amplifier of a television receiver. In the two latter cases, the motion picture screen or the television screen, as the case may be, would be mounted so as to be visible to the occupants in the cars in the parking area.

Referring now to the drawings which show a portion of a system embodying the invention, which system comprises, in general, a sound program source unit R, located in any suitable housing, such as the restaurant building, an order receiving station O, which may be located in the restaurant and a plurality of speaker stations, one of which is shown at S, and which speaker stations are located throughout the parking area of the restaurant. The unit R includes an amplifier 6, which may be of any well known design adapted to amplify a program of recorded music, for example, although it could be connected with any suitable source of sound signals of the type for reproduction by loud-speakers. The amplifier 6 is provided with a plurality of two wire buses, some of which are shown at B1, B2, B3, B4, B5 and B6. These buses are suitably insulated and shielded and they preferably extent underground to various sections of the parking area so that they may be conveniently tapped for connection with the speaker stations. For illustrating these connections bus B1, consisting of wires 4, 5, is shown connected with speaker station S.

The order receiving station O comprises a speaker-talk-back unit which includes an amplifier 7, of any suitable construction having an input circuit comprising wires 8, 9, and output circuit comprising wires 10, 11, a loud-speaker LO and a switching mechanism 12. The input and output circuits of the amplifier 7 are connected with a two wire bus consisting of wires 14, 15 suitably insulated and extending underground, preferably alongside parts of the buses B1, B2, etc., for connection with certain of the speaker stations, one of which is shown to be station S. It may be desirable to provide a plurality of order receiving stations and in that case each of such stations would be connected with a limited number of speaker stations and independently of the other order receiving stations.

The speaker station S comprises a pair of loud-speaker units 16, 17 which are mounted in individual cases 18, 19, which cases are adapted to be supported on a stand comprising a hollow post 20 and a box 21 mounted on the post. The speaker cases are provided with suitable hooks 22, 23 by which they may be supported on the box 21 or in the interior of the customer's car. Both speakers 16, 17 are energized in the usual manner, in this instance, by a transformer 24, which is located in box 21, and the primary 25 of the transformer is connected to the wires 4, 5 by wires 26, 27 extending through the post 20. The circuit by which the speaker 16 is energized to reproduce the programs coming over wires 4, 5 comprises secondary 28, line 29, solenoid switch 31, wire 32, potentiometer 33, movable arm 34 of the potentiometer, switch 35, wires 36, 37, loud-speaker, wire 38, switch 39 and wires 30, 28. The switch 31 is controlled by a coin operated timer mechanism, indicated generally at T1, which closes the switch 31 when a coin is inserted in the mechanism and maintains the switch closed for a predetermined period. The details of the timer mechanism will be described more fully hereinafter.

The circuit for connecting speaker 16 to the bus wires 14, 15 connected with the amplifier 7 comprises, wires 40, 41, switch 42, wire 43 to wire 38, loud-speaker 16, wires 37, 44, switch 45, wires 46, 47. The switches 35, 39, 42, and 45 are mounted on a common actuator plunger 48 and are mounted in the casing 18 with the plunger projecting from the latter so that it may be depressed by the operator. A spring, not shown, normally urges the plunger 48 outwardly relative to the casing for closing switches 35 and 39 and maintaining switches 42, and 45 open, and when the plunger 48 is depressed, switches 35 and 39 are opened and switches 42 and 45 are closed. Thus, the loud-speaker can be switched from the output of the program amplifier 6 to the order station wires 14, 15 at the will of the operator of the loud-speaker 16.

The circuits for the loud-speaker 17 are like the circuits for the loud-speaker 16, and corresponding elements are referred to by like reference characters bearing a prime. The timer mechanism associated with switch 31' is referred to as T2.

The timer devices T1 and T2 are adapted to control the circuit from the transformer 24 so that these circuits will be closed only by depositing a coin in the timers and the circuits will be closed for only a predetermined period for each coin deposited. Referring to the timer T1, the switch 31 is normally open and it is closable by a solenoid 50 when the latter is energized. The circuit for the solenoid comprises line 51 of a suitable source of current, such as the usual 110 volt A. C. source, switch 52, solenoid 50, wire 53 to either of switches 54, 55, which are connected in parallel circuit, wire 56, synchronous motor 57 and line 58 of the current source. The switch 52 is normally urged open by a light spring 59 and associated with suitable structure, not shown, by which it is momentarily closed by a coin inserted in a slot chute 60 provided on box 21. The switch 52 is adapted to be held closed by a solenoid 61 connected in parallel with solenoid 50. The switches 54, 55 are normally biased open and one or the other is adapted to be closed by a pivoted switch closing arm 63 which is oscillated from one switch to the other by a spring 64 connected at one end to the arm and at the other end to a crank 65 rotated by a shaft 66 driven by the synchronous motor 57 so that during each 180° of rotation of the crank, the arm will swing from one switch to the other. The crank may be driven through suitable gear reduction mechanism, not shown, at a rate such that the time required to rotate the same through 180° will correspond to the interval of program reproduction by the speaker unit desired for each coin deposited. When the arm 63 swings from one switch to the other, both switches 54, 55 will be momentarily open which deenergizes the solenoid 61 and opens switch 52 thereby breaking the circuit in the solenoid for switch 31. It will be understood that coin controlled timers of other suitable constructions than that shown could be employed for controlling the program transmitting circuit. Timer T2 is of like construction and the elements thereof corresponding to those of timer T1 bear like reference characters having a prime affixed thereto.

The speaker unit 16 is adapted to be connected with the input of the amplifier 7, when switch member 48 is depressed, through wires 40, 14, 70, switch 71, wire 8 to the amplifier, return wire 9, switch 72, wires 73, 15, and 47. The loud-speaker LO is connected in the output circuit of amplifier 7 by wires 10, 74, switch 75, wire 76, loud-speaker, wire 77, switch 78 and wires 79, 11. The circuits just described enable the restaurant patron using the loud-speaker 16, for example, to talk into the loud-speaker when switch member 48 is depressed, and to have his voice reproduced over speaker LO whereby he may place an order with the restaurant. The same is true with respect to the speaker unit 17 as the circuit arrangements are duplicated in the speaker units. The order taker may talk back through speakers 16 or 17, as the case may be, by reversing the input and output circuit connections of the amplifier 7 by the switching mechanism 12. The talk-back circuits include a circuit from loud-speaker LO to the input of amplifier 7 through wires 76, 80, switch 81, wire 82 to wire 8, wire 9 to wire 83, switch 84, wires 85 and 77. The output circuit of amplifier 7 is connected to wires 14, 15 by wire 10, switch 86, wire 87 to wire 14, and by wire 11, switch 88 and wire 89 to wire 15. The switching mechanism 12 comprises a switch operating member 90 to which the switches 71, 72, 75, 78, 81, 84, 86 and 88 are connected for actuation thereby. The member 90 is biased upwardly, as viewed in Fig. 2, by a spring, not shown, and normally the switches 71, 72, 75, 78 are closed and switches 81, 84, 86, 88 are open whereby speaker LO will receive and reproduce any communications from the speaker units connected therewith. Where it is desired to talk back to the in-car speaker units the switch member 90 is depressed which opens switches 71, 72, 75, 78 and closes switches 81, 84, 86, 88 so that the output of amplifiers 7 will be connected to the in-car speaker unit circuits.

As suggested hereinbefore, the station O may be connected with a limited number of the in-car speaker units to reduce the likelihood of confusion of communication and a number of such stations may be provided at a particular location in the restaurant establishment.

It will be seen that although the customer must deposit a coin to receive programs eminating from station R, he can at any time communicate with the station O whether or not a coin has been deposited. By this arrangement, the ordering of food by the customers is expedited; additional revenue for the restaurant may be forthcoming through the coin operated program receiver control of the in-car speaker units; and the availability of program reproductions provides an inducement for patronage of the restaurant.

As a further alternative construction, a television screen may be incorporated in each of the speaker units and its connection with the program source controlled by the coin controlled mechanism along with the speaker proper. It is also to be understood that means other than the coin controlled timing mechanism described may be employed for connecting the program reproducing mechanism with the program source; for example, an attendant may turn on the program. As a further alternative arrangement the coin controlled mechanism, which connects the program reproducing means with the program source, may not include timing mechanism and thereby make the connection for an indefinite period of time upon the insertion of a coin by the patron.

From the foregoing description of the preferred embodiment of the invention, it will be apparent that the objects heretofore enumerated and others have been accomplished and that there has been provided a novel and improved in-car speaker system for drive-in theatres, restaurants and theatre-restaurants whereby the customers may pay for and listen to entertainment programs while seated in their cars, and in some instances they may communicate with the operators of the restaurant for ordering service. The system requires but a minimum of equipment, and utilizes the loud-speaker of the speaker unit as a microphone for communications with the restaurant operators. While the preferred embodiment of the invention has been described in considerable detail, it will be apparent that the invention is not limited to the particular arrangement and construction shown and it is my intention to cover hereby all adaptations, modifications and uses thereof which come within the practice of those skilled in the art to which the invention relates and within the scope of the appended claim.

Having thus described my invention, I claim:

A sound reproducing and communicating system for a drive-in restaurant comprising: an entertainment program source; a plurality of program reproducing units distributed throughout a parking area; circuit means including coin controlled mechanism for connecting said source with said units for reproduction of programs by said units; an order receiving station comprising an amplifier and loud-speaker; circuit means for connecting said units with said amplifier; manually operated switching means at the individual units for effecting connections of said units with the second mentioned circuit means independently of said coin controlled mechanism; and switching means at the order receiving station for connecting the input of said amplifier with the second mentioned circuit means and simultaneously maintaining the output of the amplifier with said second mentioned speaker unit, the last mentioned switching means being operable to disconnect the input of said amplifier with said second mentioned circuit means and to connect said input with said second mentioned speaker unit and said output with said second mentioned circuit.

EDWARD B. BRADY.

REFERENCES CITED

The following references are of record in the file of this patent:

UNITED STATES PATENTS

| Number | Name | Date |
|---|---|---|
| Re. 21,462 | Andres | May 28, 1940 |
| 1,210,314 | Hoefer | Dec. 26, 1916 |
| 2,028,630 | Stark | Jan. 21, 1936 |
| 2,241,663 | Hanslett | May 13, 1941 |
| 2,312,680 | Stone | Mar. 2, 1943 |
| 2,362,244 | Chejnowski | Nov. 7, 1944 |
| 2,413,700 | Farrell | Jan. 7, 1947 |
| 2,463,339 | Wetzel | Mar. 1, 1949 |
| 2,469,986 | Phyfe | May 10, 1949 |